(12) United States Patent
Grinberg

(10) Patent No.: US 6,793,194 B1
(45) Date of Patent: Sep. 21, 2004

(54) ROTARY VALVE ACTUATOR

(75) Inventor: Joseph Grinberg, Mizpeh Gita (IL)

(73) Assignee: BG Tech Ltd., Haifa Bay (IL)

( * ) Notice: Subject to any disclaimer, the term of this patent is extended or adjusted under 35 U.S.C. 154(b) by 0 days.

(21) Appl. No.: 10/424,949

(22) Filed: Apr. 29, 2003

(51) Int. Cl.$^7$ .......................................... F16K 31/122

(52) U.S. Cl. ........................ 251/58; 251/63.6; 251/263; 92/31; 74/55

(58) Field of Search ...................... 257/58, 63.6, 263; 92/31, 32, 33; 74/55

(56) References Cited

U.S. PATENT DOCUMENTS

| | | | |
|---|---|---|---|
| 2,975,976 A | * 3/1961 | Smith | .......................... 251/58 |
| 2,998,805 A | 9/1961 | Usab | |
| 3,184,214 A | 5/1965 | King | |
| 3,319,925 A | 5/1967 | Kojima et al. | |
| 3,391,722 A | * 7/1968 | Ligh | .............................. 92/31 |
| 4,504,038 A | * 3/1985 | King | .......................... 251/58 |
| 5,134,923 A | * 8/1992 | Wexler | .......................... 92/31 |
| 5,419,237 A | * 5/1995 | Jeppsson | ........................ 92/31 |

FOREIGN PATENT DOCUMENTS

| | | |
|---|---|---|
| DE | 0050466 | 4/1982 |
| DE | 0622574 | 11/1994 |
| DE | 19756425 | 3/1998 |
| GB | 1193190 | 5/1970 |

OTHER PUBLICATIONS

Drawing Sheet, "Helicoidal actuator" manufactured by SGRM, 1 page.
Drawing Sheet, "Helicoidal actuator" manufactured by Kielselmann, 1 page.

* cited by examiner

*Primary Examiner*—John Bastianelli
(74) *Attorney, Agent, or Firm*—Blank Rome LLP

(57) ABSTRACT

An actuator for operation of a valve, said actuator comprising tubular housing, which accommodates therein a piston, mounted with possibility for reciprocating linear stroke motion, an operating rod, which is operatively coupled with the piston and is rotatable about the longitudinal axis upon reciprocating stroke motion of the piston and a cam follower arrangement for transferring the piston reciprocating linear stroke motion into rotation of the operating rod, The actuator is provided with at least two fixing rods for preventing rotation of the piston. The fixing rods are rigidly secured at one end wall of the cylinder. The fixing rods extend parallel to the longitudinal axis and enter into respective blind passages provided at the first piston end to allow the linear stroke motion. The actuator is provided with at least two additional fixing rods, to enable the linear stroke motion. The additional rods are parallel to the longitudinal axis and enter into respective blind passages provided at the second piston end.

11 Claims, 4 Drawing Sheets

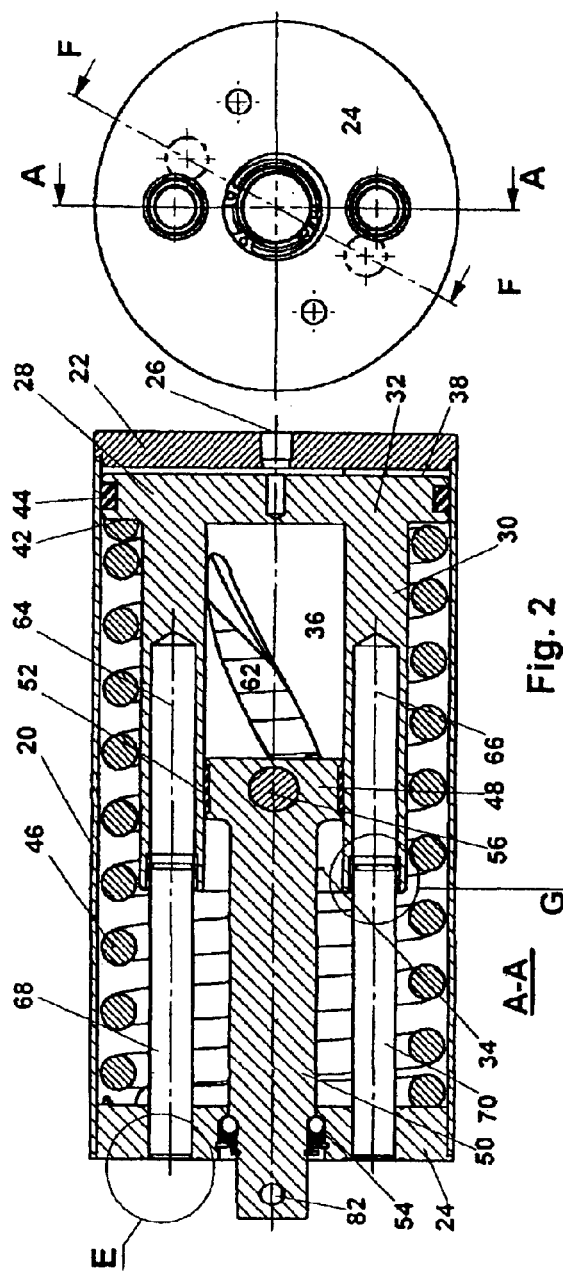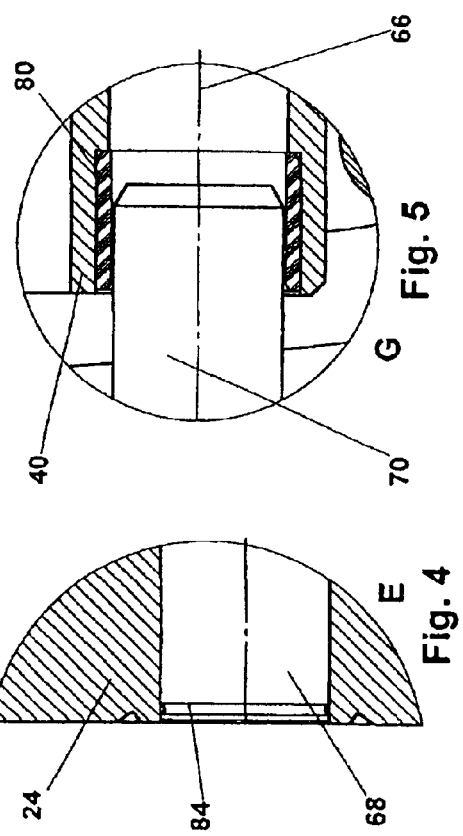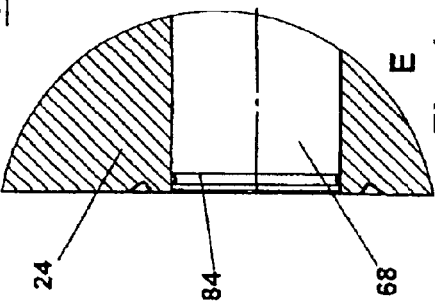

ROTARY VALVE ACTUATOR

BACKGROUND OF THE INVENTION

1. Field of the Invention

The present invention relates to fluid-actuated devices for displacing a member from one position to another. More particularly the invention concerns actuators suitable to transfer a linear input motion to a rotary output motion for controlling of operation of valves provided with rotating member, e.g. butterfly valves, ball valves etc.

It should be appreciated, however, that the invention could be employed for actuating of other valves, which require for controlling of their operation rotating of a member by approximately 90 degrees between an open and closed position.

2. Description of the Related Art

There are known various rotary actuators used for actuating of rotary valves. Typically the rotary actuators employ pressurized fluid Entering an expandable chamber to drive a piston, which is mechanically connected to the valve stem and closes or opens it.

There are known in the art also so-called helical rotary actuators, in which upon applying of hydraulic or pneumatic pressure to one side of a piston the linear stroke of the piston rod is converted to rotational movement of a driving member that is engaged with a valve. This conversion is achieved by virtue of the fact that the driving member is provided with rollers, which engage helical slots formed in the wall of the piston. The piston is provided with a means for preventing twisting, when the rollers slide within the helical slots. Accordingly the piston is allowed to linearly reciprocate, while twisting motion is transferred to the driving member. An example of such helical rotary actuator is described in EP50466, EP622574, in U.S. Pat. No. 3319925, in GB1193190 etc.

The problem, which should be dealt with this type of rotary actuators, is associated with the fact that special measures should be provided to reliably prevent twisting of the piston due to the torque concentrated at the ends of the housing surrounding the driving member and the piston.

One known solution to this problem can be found in U.S. Pat. No. 2998805, in which for preventing twisting of the piston a key is formed in an outer wall of the piston, which engages a slot formed in the inner wall of a surrounding internal chamber of the housing of the piston. Another solution based on this principle can be found in U.S. Pat. No. 3,184,214.

There exists also a solution of this problem by virtue of fixing rods, which are mounted on the base plate of the actuator at one side thereof The rods extend longitudinally within the piston and form a fixed stop, which prevents the piston from twisting but at the same time does not obstruct axial displacement of the piston during the stroke, since the piston can slide over the rods.

This solution is implemented for example in a rotary actuator disclosed in DE19756425. This actuator produces twisting force, which is opposed by the fixing rods.

It is known, however, that during operating of butterfly valves and ball valves, the maximum of torque is required in the very beginning of opening and in the end of closing action. Accordingly the twisting force associated with the torque reaches its maximum, when it is applied to the most distant point of the rods. In other words the bending moment acting on the fixing rods reaches its maximum when the actuator begins its operation. Accordingly the bending moment is proportional to the length of the rods. This requires design of robust and strong rods, which renders actuator unjustified cumbersome and heavy. Therefore the achievable load, which could be developed by such actuators, is not exploited fully, since it is dictated by the actuator size, which in its turn limits the rods strength. For example, in practice an actuator with piston diameter of 100 mm provides torque not more than about 50–75 Nm.

Due to this limitation the majority of commercially available actuators are employed for operating of valves, which do not require applying of high torques. Although this might satisfy such applications like control the flow of milk, vine, juice, oil or other food products, nevertheless this is not sufficient for heavy-duty applications, e.g. petrochemical applications, oil industry, chemical plants etc.

There is known still further solution, which has been devised to overcome the above-mentioned limitation. This solution is employed for example in helical valve actuators manufactured by company SGRM, France or by company Kiesselman, Germany. According to this solution the actuator is provided with two fixing rods, which go through the piston body and extend along the whole length of the actuator chamber. The opposite ends of the rods are screwed in corresponding through openings provided at opposite sides of the chamber. Since the rods go through the piston appropriate sealing ring is provided between each rod and the piston to prevent leakage of the pressurized fluid media and at the same time to allow the piston to slide over the rods without twisting.

The advantage of this design is associated with the fact, that much higher torques can be safely developed by the actuator and applied to a valve. On the other hand, reciprocating sliding of the piston is associated with intensive wear of the scaling rings and therefore leakages may often occur during operation of the actuator, which significantly shorten its service life.

In conclusion it should be emphasized that despite numerous helical actuators for operating of rotary valves have been devised there is a need for a new and improved actuator, which is simple, inexpensive, convenient in manufacturing and exploitation and which ensures efficient and reliable operation.

OBJECT OF THE INVENTION

The object of the present invention is to provide a new and improved helical rotary valve actuator enabling sufficiently reduce or overcome the above-mentioned drawbacks of the known in the art solutions.

The main object of the present invention is to provide a new and improved actuator, which combines advantages of the known in the art actuators, but is free of their drawbacks.

In particular one of the objects of the invention is to provide such helical actuator, which is capable to develop high torque irrespective of the length of fixing rods and piston diameter.

Still further object of the invention is to devise such helical actuator, in which there is no leakage is possible between the fixing rods and piston and which accordingly has increased service life.

Yet another object of the invention is to devise such helical actuator, which has very simple construction and which can be inexpensively and easily fabricated.

The further object of the present invention is to provide new and versatile helical actuator, which is suitable for controlling operation of valves in a wide range of industrial applications irrespective of type and flow rate of liquid, passing through the valve.

The above and other objects and advantages of the present invention can be achieved in the actuator, which main embodiment is defined as follows.

An actuator for operating a valve provided with rotatable valve member, said actuator comprising:

a tubular housing, having a longitudinal axis, said housing is defined by a peripheral cylindrical wall and by two opposite end walls, said housing is in fluid communication with a source of pressurized fluid medium, said housing accommodating therein a piston, mounted with possibility for reciprocating linear stroke motion along the longitudinal axis in a forward and a backward direction between one end wall and the opposite end wall, said piston is defined by a concentric with the housing periphery body portion arid by a first end and by a second end, said piston is actuatable from at least one end thereof, an operating rod, which is operatively coupled with the piston with possibility for rotation about the longitudinal axis upon reciprocating stroke motion of the piston, said operating rod is adapted to output a rotation moment to the valve member, a cam follower arrangement for transferring the piston reciprocating stroke motion into rotation of the operating rod, said arrangement comprises at least one cam follower means, which is associated with the operating rod and is displaceable along a helical path provided in the piston, at least two fixing rods, which are rigidly secured at one end wall of the cylinder vis-à-vis the first end of the piston, said fixing rods extend parallel to the longitudinal axis and enter into respective blind passages provided at the second piston end to enable linear stroke motion, wherein said actuator is provided with at least two additional fixing rods, which are rigidly secured at the opposite end wall of the cylinder vis-à-vis the second piston end, said additional fixing rods extend parallel to the longitudinal axis and enter into respective blind passages provided at the second piston end to enable linear stroke motion.

The present invention has only been summarized briefly. For better understanding of the present invention as well of its advantages, reference will now be made to the following description of its various embodiments with reference to the accompanying drawings.

BRIEF DESCRIPTION OF THE DRAWINGS

FIG. 2 is a cross-sectional view of the actuator of the invention taken along direction A—A.

FIG. 3 is a side view of the actuator of the invention, in which direction of cross-sections A—A and F—F is shown.

FIGS. 4, 5 present in enlarged scale details E and G designated in FIG. 2.

DETAILED DESCRIPTION OF THE PREFERRED EMBODIMENTS

The present invention is mainly directed to actuating of valves, provided with a rotatable valve member, like butterfly valve gate, ballcock of a ball valve, throttle of a throttle valve etc. It should be appreciated, however, that the invention could be implemented for actuating of other valves or for actuating other mechanisms, in which it is required to convert an input linear motion into output rotary motion.

Figure 1:
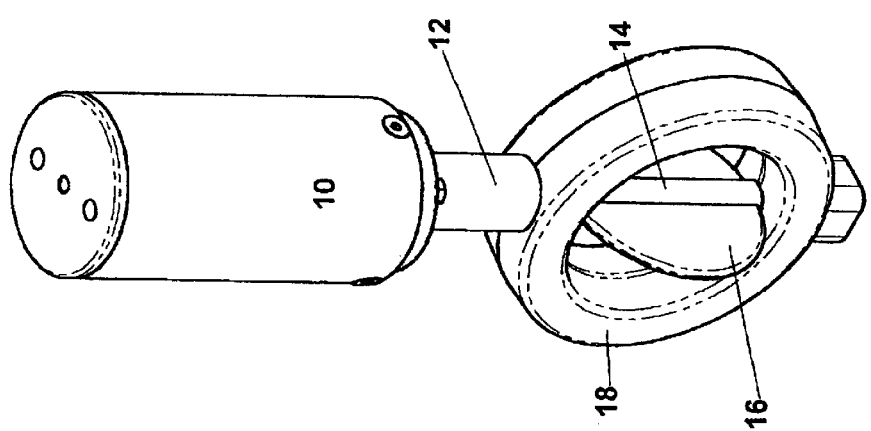
FIG. 1 shows schematically the actuator of the invention in conjunction with a rotary valve actuated thereby.
Figure 7:
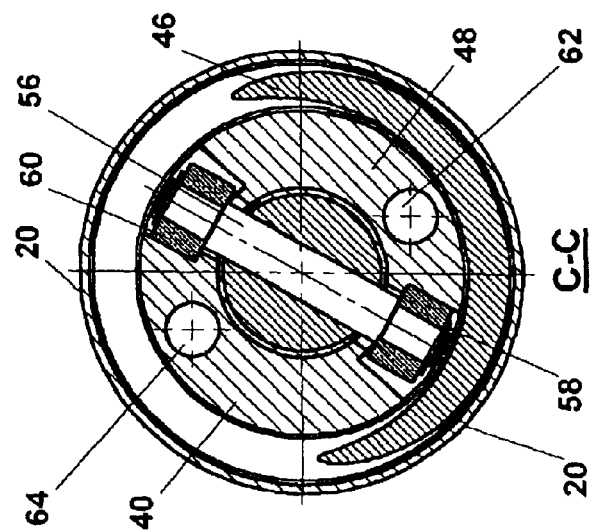
FIG. 7 is a cross-sectional view of the actuator of the invention taken along direction C—C.

Referring now to FIG. 1, depicting merely an example of the application of the present invention it is seen an actuator 10, which output member 12, is operatively coupled with an axle 14 of a rotating gate 16 of a butterfly valve 18. The gate is rotatable by the actuator between a fully open position, shown in FIG. 1 and a fully closed position, in which the gate is turned by 90 degrees to seal the valve and to stop passage of a liquid therethrough.

It is not shown specifically in the drawings but should be appreciated that the actuator is driven by a pressurized fluid medium supplied thereto from appropriate source. Supply of the fluid medium is governed by a control means, which stops or resumes fluid communication between the actuator and the source of the fluid medium.

Figure 6:
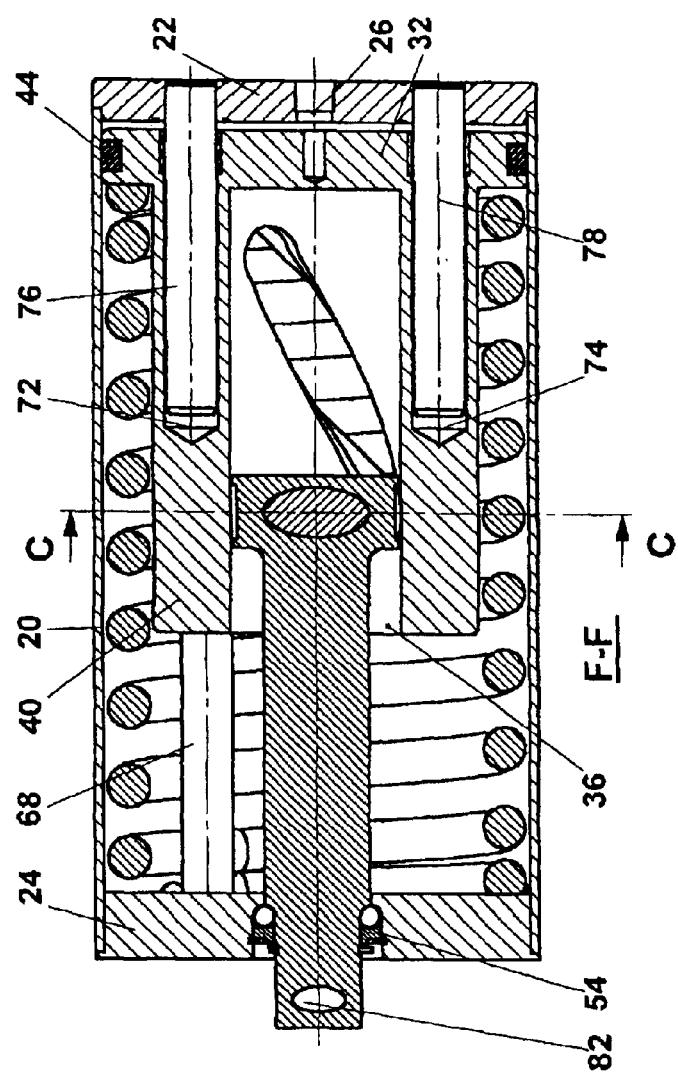
FIG. 6 is an additional cross-sectional view of the actuator of the invention taken along direction F—F.

Referring now to FIG. 2 it is seen that the actuator consists of a tubular housing extending along a central longitudinal axis X—X. The housing accommodates therein the other components of the actuator as will be explained further. The housing is defined by a peripheral cylindrical periphery portion 20, which is closed at its opposite ends by respective end walls 22,24. The wall 22 is provided with an opening 26 for fluid communication with a source of pressurized fluid medium (not shown) to be supplied to the using when it is required to drive the actuator. Residing within the housing and displaceable between the end walls along the axis X—X a piston 28 is provided. The piston is configured as a cup-like member, defined by a concentric with the hosing periphery body portion 30, by a first end 32 and by an opposite second end 34. Within the body portion a central cylindrical blind bore 36 is formed, which is co-axial with the axis X—X and opens to the second end 34. Accordingly, as best seen in FIG. 6, the first end 32 of the piston is provided with a flat circular surface 38 facing the end wall 22 of the housing. The second end 34 is provided with annular surface 40 facing the second end wall 24. Since the outside diameter of the body portion is less than the outside diameter of the first end 32 a ring-like shoulder 42-is provided opposite the circular surface 38.

The piston is actuatable at its first end 32, when the pressurized fluid medium enters the housing via opening 26, acts on the flat surface 38 and thus displaces the piston along the axis X—X. Appropriate sealing gasket 44 is secured at the end 32 to prevent leakage of the fluid medium between the piston and periphery portion of the tubular housing. Situated between the end 24 and the shoulder 42 a coil spring 44 is provided, which is depressed when the piston displaces towards the second end wall 24. In the further description this displacement will be referred-to as a forward linear stroke motion. The spring produces biasing force, which acts on the shoulder and displaces the piston to the first end wall 22. In the further description this displacement will be referred-to as a backward linear stroke motion. It should be appreciated that the above designations of the linear stroke motion are merely conventional and accordingly displacement from the first end towards the second end wall could be referred-to as a backward linear stroke motion, while the opposite displacement could be referred-to as a forward linear stroke motion.

Entering within the blind bore 36 an operating rod is provided, which is mounted in the housing co-axially with the piston. The rod is defined by a head portion 48, which outside diameter closely matches the inside diameter of the bore and a tail portion 50, which extends from the housing through an opening provided in the end wall 24. The head portion is provided with a bushing 52, which is made of material with low friction coefficient to enable sliding of the operation rod in the bore. A ball bearing 54 is mounted in the end wall 24 to enable rotation of the operating rod about the longitudinal axis X—X. The head portion is provided with a through bore, in which a cross pin 56 is rigidly secured. Mounted on the opposite ends of the cross pin two rollers 58,60 are provided, which can rotate.

Two opposite helical slots are cut in the periphery body portion of the piston. One of the slots is seen in FIGS. 2, 6 and it is designated by reference numeral 62. The slots are dimensioned and configured to allow frictional engagement with the rollers and thus their forcible rolling along the slots during linear stroke motion of the piston. It can be readily appreciated that the rollers and the slots provide a cam follower arrangement, in which the rollers constitute a cam follower means, which is urged to follow helical trajectory of the slots.

Extending within the periphery body portion 30 two blind passages 64,66 are provided, which are open at the annular surface 40. Rigidly secured in the end wall 24 of the housing two fixing rods 68,70 are provided, which enter into respective blind passages 64,66 made in the piston. Referring not to FIG. 6 it is seen, that two additional blind passages 72,74 are made in the piston. The additional blind passages extend into periphery body portion from the second end of the piston and they are open at the flat circular surface 38. As best seen in FIG. 3 the blind passages made at the first and at the second end of the piston are disposed diametrically, however they do not communicate therebetween and they are not aligned. Rigidly secured in the end wall 22 of the housing two additional fixing rods 76,78 are provided, which enter into respective blind passages 72,74.

It can be readily appreciated that since the passages 64,66 and 72,74 do not communicate leakage of the fluid medium through the passages is not possible.

As best seen in FIG. 5 a bushing 80 is inserted in the passage 66 to enable frictional engagement and sliding of the rod 70 in the passage when the piston is displaced. The minimize friction the bushing is made of material having low friction coefficient, e.g. a plastic material. It is not shown specifically but should be appreciated that such bushing is provided in each passage and accordingly sliding of respective rod within respective passage is provided during linear stroke motion of the piston.

Referring no to FIG. 6 it is seen that the length of the fixing rods is slightly less than the depth of the blind passage and this to allow full stroke motion of the piston, when it is driven by pressure of the fluid medium in the forward direction or by the spring biasing force in the backward direction.

At the same time it can be readily appreciated that since the rods are situated diametrically they prevent rotation of the piston during the piston stroke motion and they allow only its linear displacement. On the other hand, due to frictional engagement between the slots and rollers the cross pin 56 is rotatable about the axis X—X together with the operation rod when the rollers roll along the slots. In other words by virtue of the cam follower arrangement it is possible to transfer the input linear stroke motion of the piston into output rotation motion of the operation rod. The associated torque can be outputted to a rotatable valve member for example by virtue of a pin connection 82 provided on the rod end, extending from the actuator.

Figure 8:
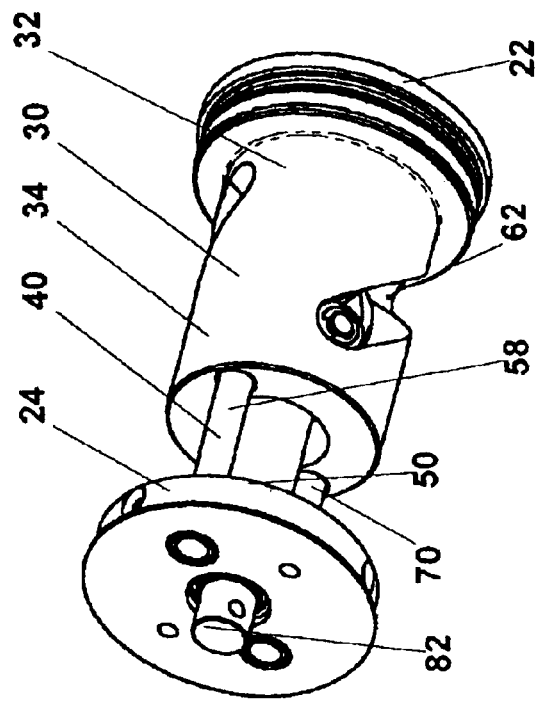
FIGS. 8,9 are three-dimensional views of the actuator with its piston linearly displacing from one position to the opposite position causing rotation of the acting rod by 90 degrees.

Referring now to FIGS. 2,6,8,9 it will be explained now how the actuator of the invention operates. In FIGS. 2,8 it is seen that the spring presses the piston to the end wall 22 of the housing. Fixing rods 76,78 are not seen, since they fully penetrate the corresponding passages provided at the piston end 32. At the same time the fixing rods 68,70 are seen, since their major length is exposed and is just about to penetrate into corresponding passages 64,66, provided at the opposite piston end 34. The roller 58 is in the end of the corresponding helical slot 62; the pin connection 82 is in its first position. Supplying of pressurized fluid medium causes the piston to move forward to execute linear stroke towards the end wall 24 against spring 46.

Figure 9:
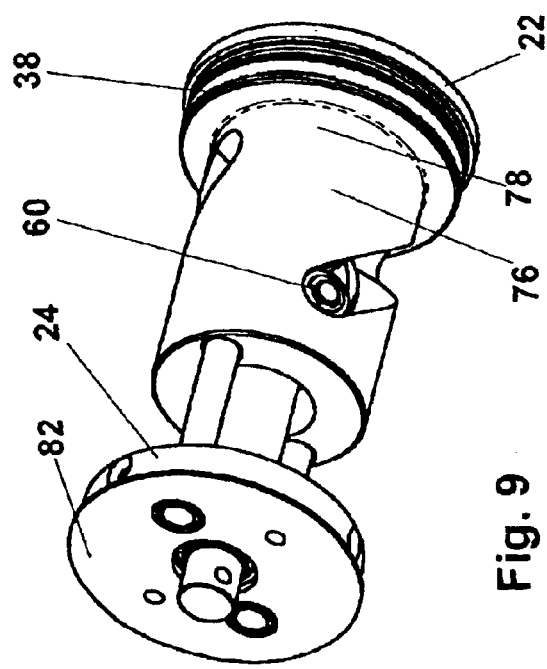

In FIG. 9 the piston is depicted, when it is brought to the end wall 24. It can be realized, that during the forward stroke motion the piston slides over rods 68,70,76, 78 by virtue of bushings, situated in the respective blind passages. Rods 68,70 are not seen, since they are inside passages 64,66, while rods 76,78 are now outside passages 76,78 and thus are exposed. Roller 60 has reached the opposite end of respective helical slot rendering the operation rod to rotate by 90 degrees and to bring pin connection 82 in its second position shown in FIG. 9. The piston is ready now to execute backward linear stroke motion towards end wall 22.

During the forward stroke motion the piston is prevented from twisting by virtue of fixing rods 76,78 and during the backward stroke motion it is prevented from twisting by virtue of fixing rods 68,70. In both cases a bending force acts on the rods, which is proportional to the required torque outputted from the operation rod. Associated with this force bending moment would be proportional to the stroke length. It can be appreciated, that by virtue of two separate pairs of fixing rods, which enter into respective blind passages provided at opposite piston ends the bending moment in the beginning of the stroke motion is less, since the force would be applied only on that part of the rod's length, which is adjacent the respective housing end wall. Thus it is ensured, that despite the force associated with the beginning of the stroke motion is at maximum (closing or opening the valve gate), the rods would not be exposed to excessive bending moment. By virtue of this provision fixing rods of shorter lengths and lesser diameter can be employed in the actuator.

It can be easily appreciated also that since the passages are blind and don't communicate therebetween it is possible to exclude leakage of fluid medium during the piston stroke motion and therefore to improve significantly the actuator's service life.

The rods can be rigidly secured within the respective end walls of the housing by various methods. For example embossing is very convenient method, which can be easily carried in practice. For this purpose a shallow and narrow annular groove 84 is cut very close to the end of the rod, which is to be secured in the end wall. In FIG. 4 it is seen such a groove cut in the rod 68, which is secured in the end wall 24. In the end wall a through bore is drilled, which inside diameter closely matches the outside diameter of the rod. The rod is inserted in the bore and two ring-like dies made of material, which is harder then material of the end wall, are put at both sides of the end wall. The dies are pressed within a press to emboss those regions of the end wall, which surround the rod. By virtue of plastic deformation the end wall material rises, enters the bore, fills the groove and thus reliably secures the end of the rod within the end wall. To render the embossing process more easy the end walls can be made of plastically deformable metallic material, e.g. aluminum-based alloy, like Aluminum 6061 etc.

The actuator of the invention has very simple construction and its piston can be made either of metallic or non-metallic materials. Selection of particular material depends on the application and the required torque to be outputted.

In vast majority of applications, where it is not necessary to apply high torques, e.g. in food industry, the piston can be made of plastic. If, however, high torqueses are required, e.g. in chemical industry, the piston is to be made from metal, e.g. stainless steel or other conventional material. It can be readily appreciated, that due to very simple design manufacturing of the actuator is very easy, convenient and inexpensive.

In practice the invention has been successfully implemented in an actuator, having its piston defined by the outside diameter 100 mm, by the diameter of the body portion 75 mm and by the width of the annular wall 15 mm. Four blind passages were made in the piston for four fixing rods, secured at the housing end walls. With this actuator it was possible to output torque of 130–150 nM, which is two times more, than with an actuator of similar design, but provided only with two fixing rods. The actuator of the invention was tested many times and even after 500000 strokes no leakages were observed. In an actuator of similar size provided with two thoroughgoing fixing rods leakages were observed already after 80000 strokes.

It should be appreciated that the present invention is not limited by the above-described embodiments and that one ordinarily skilled in the art can make changes and modifications without deviation from the scope of the invention as will be defined below in the appended claims.

Below are listed only some of the modifications, which are within the scope of invention.

For example it is not necessary that the piston embrace the operation rod. One can contemplate also a possibility, that the operation rod embrace the piston. It is further possible, that the piston is actuatable from its both ends. The cam follower arrangement may include more than two rollers and more than two helical slots. Instead of thoroughgoing slot a groove can be cut in the piston periphery body portion to provide for helical path along the cam means can follow.

More than two fixing rods could be employed for preventing rotational displacement of the piston.

It should also be appreciated that features disclosed in the foregoing description, and/or in the foregoing drawings, and/or examples, and/or following claims both separately and in any combination thereof, be material for realizing the present invention in diverse forms thereof.

I claim:

1. An actuator for operation of a valve provided with a rotatable valve member, said actuator comprising:
   a tubular housing, defined by a longitudinal axis, by a peripheral cylindrical wall and by two opposite end walls, said housing accommodating therein
   a piston, mounted with possibility for reciprocating linear stroke motion along the longitudinal axis in a forward and a backward direction between one end wall and the opposite end wall, said piston is defined by a periphery body portion, which is concentric with the housing and by a first and by a second end, said piston is actuatable from at least one end thereof,
   an operating rod, which is operatively coupled with the piston and is rotatable about the longitudinal axis upon reciprocating stroke motion of the piston, said operating rod is adapted to output a rotation moment to the valve member,
   a cam follower arrangement for transferring the piston reciprocating linear stroke motion into rotation of the operating rod, said arrangement comprises a cam follower means, which is associated with the operating rod and is displaceable along a helical path provided in the piston,
   at least two fixing rods, which are rigidly secured at one end wall of the cylinder vis-à-vis the first end of the piston, said fixing rods extend parallel to the longitudinal axis and enter into respective blind passages provided at the first piston end to allow the linear stroke motion,
   wherein said actuator is provided with at least two additional fixing rods, which are rigidly secured at an opposite end wall of the cylinder vis-à-vis a second piston end, said additional fixing rods extend parallel to the longitudinal axis and enter into respective blind passages provided at the said second piston end to enable the linear stroke motion.

2. The actuator as defined in claim 1, in which said piston is defined by a cup-like body portion, wherein said piston is mounted in the housing with possibility to slide over the operating rod during the reciprocating linear stroke motion.

3. The actuator as defined in claim 2, in which said cam follower means comprises at least one roller, which is carried by a cross-pin secured in a transverse bore provided in the operating rod.

4. The actuator as defined in claim 3, in which said helical path comprises at least one helical slot cut in the piston periphery body portion.

5. The actuator as defined in claim 4, in which said cam follower arrangement comprises two rollers and two corresponding helical slots, said slots are defined by the same helix angle.

6. The actuator as defined in claim 5, in which said piston is actuatable at its first end to enable forward linear stroke motion and there is provided a biasing means acting on the second piston end to enable backward linear stroke motion.

7. The actuator as defined in claim 6, in which the blind passages provided at the first piston end do not communicate with the blind passages provided at the second piston end.

8. The actuator as defined in claim 1, in which a bushing means is provided in at least one blind passage to enable frictional engagement with the fixing rod entering this blind passage.

9. The actuator as defined in claim 8, in which said bushing means is made of a material with low friction coefficient.

10. The actuator as defined in claim 9, in which said bushing means is made of plastic material.

11. The actuator as defined in claim 1, in which said fixing rods are rigidly secured in the end walls by embossing of the end wall material around the rods.

* * * * *